US006558595B1

(12) United States Patent
Lotz

(10) Patent No.: US 6,558,595 B1
(45) Date of Patent: May 6, 2003

(54) METHOD FOR PRODUCING VIRTUALLY FINISHED MOULDED BODIES FROM MOULDING MATERIALS

(75) Inventor: Wolfgang Lotz, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/622,108

(22) PCT Filed: Jan. 20, 1999

(86) PCT No.: PCT/EP99/00341

§ 371 (c)(1),
(2), (4) Date: Oct. 2, 2000

(87) PCT Pub. No.: WO99/41209

PCT Pub. Date: Aug. 19, 1999

(30) Foreign Application Priority Data

Feb. 12, 1998 (DE) .......................... 198 05 608

(51) Int. Cl.⁷ .......................... B29C 43/00; B29C 70/00
(52) U.S. Cl. ..................... 264/122; 264/123; 264/257; 264/331.11; 264/331.22
(58) Field of Search ................. 264/109–128, 264/257, 331.11, 331.22

(56) References Cited

U.S. PATENT DOCUMENTS

| 3,932,350 | A | * | 1/1976 | Yamaguchi et al. | ........ 524/650 |
| 4,267,147 | A | * | 5/1981 | Pogoda et al. | ............. 264/571 |
| 4,320,079 | A |   | 3/1982 | Minnear et al. | |
| 4,516,996 | A |   | 5/1985 | Willard et al. | |

FOREIGN PATENT DOCUMENTS

GB                613098              11/1948

* cited by examiner

Primary Examiner—Stephen J. Lechert, Jr.
(74) Attorney, Agent, or Firm—Crowell & Moring LLP

(57) ABSTRACT

The present invention relates to a process for producing close-to-final-shape moldings from pressing compositions, in which reinforcing fibers, fiber bundles, fiber fabrics, fiber mats and/or random fiber agglomerates based on metal, glass, carbon, nitrogen, silicon and/or boron, one or more binders and, if desired, one or more additives or fillers are mixed to give a pressing composition and pressed in a pressing mold under the action of pressure to give a molding, where a curable carbonizable polymer is used as binder. The invention provides for a cold-curing binder to be used and the curing reaction to be initiated by addition of a catalyst, with pressure only being applied after the curing reaction has commenced.

26 Claims, No Drawings

METHOD FOR PRODUCING VIRTUALLY FINISHED MOULDED BODIES FROM MOULDING MATERIALS

CROSS-REFERENCE TO RELATED APPLICATION

This application claims the benefit under 35 U.S.C. 371 of PCT/EP99/00341 filed Jan. 20, 1999.

FIELD OF THE INVENTION

The present invention relates to a process for producing close-to-final-shape mouldings from moulding compositions, in which reinforcing fibres, fibre bundles, fibre fabrics, fibre mats and/or random fibre agglomerates based on carbon, nitrogen, silicon and/or boron, one or more binders and, if desired, one or more additives or fillers are mixed to give a pressing composition and are pressed in a pressing mould under the action of pressure to give a moulding, where a curable carbonizable polymer is used as binder.

BACKGROUND OF THE INVENTION

Such mouldings are also referred to as green bodies. They serve, for example, as intermediates within the overall process for producing C/SiC ceramic parts, as is known, for example, from DE 44 38 455 C1 and from the applications 197 11 831.3 and 197 11 829.1 which are not prior publications.

In these known processes, conditioned fibres or fibre bundles which have generally been coated with pitch and/or carbonizable polymer are mixed with a binder and, if desired, fillers or further additives and pressed to give a close-to-final-shape green body. The binder is cured at temperatures above 120° C., generally at from about 140 to 180° C. (hot curing). The green body is pyrolysed under protective gas to form a porous C/C body, with the binder being carbonized to give a carbon matrix. The porous C/C body is subsequently melt-infiltrated with liquid metal or liquid silicon. Here, the silicon reacts in large measure with the carbon matrix to form ceramic silicon carbide.

The pressing procedure determines important materials properties of the future C/SiC ceramic part. The greater the pressing pressure or the longer the pressing time, the more dense the resulting green body and the smaller the future pore content. It follows from this that the metal or silicon content of the ceramic body is also low after the melt infiltration. These properties are desired, in particular, in the production of brake discs. The desired density of the green body depends essentially on the starting material. It can be, for example, in a range from about 1.2 to 1.5 $g/cm^3$, which results in a correspondingly low silicon content in the finished C/SiC ceramic part. The pressing composition or the resulting part therefore has to be subjected to a high pressure within the mould during curing. Since the pressing composition is compressible, sometimes considerable amounts escape at the joints of the mould during hot curing of fibre-reinforced pressing compositions having a high proportion of binders (up to 50% by weight based on the fibre content) because of the pressing pressure (and sometimes because of softening of the binder).

The binder which has escaped and is located in the joints and outside on the mould is likewise cured and presents problems in the rapid removal of the finished green body from the mould. Furthermore, the contaminated mould has to be subjected to cumbersome and time-consuming cleaning to remove the residues of resin which have escaped. This leads to time delays in production, which is disadvantageous, particularly in mass production.

It is therefore an object of the present invention to improve a process of the abovementioned type in such a way that the disadvantages mentioned are encountered to a very small extent, if at all, especially in mass production.

SUMMARY OF THE INVENTION

The solution is to use a cold-curing binder and to initiate the curing reaction by addition of a catalyst, with pressure only being applied after the curing reaction has commenced.

The feature "cold-curing binder" is intended to encompass all substances which cure at temperatures up to about 100° C.

The process of the invention has the advantage that a transitional, thermally induced lowering of viscosity of the binder does not occur, but rather the binder becomes steadily more solid during the course of curing and the pressure can also be increased to this degree without binder residues getting into the joints of the mould or even escaping to the outside at these joints. A further advantage is the energy saving, since no heating is required. Furthermore, the catalytically initiated curing reaction proceeds more rapidly and if the reactants and the catalyst are paired appropriately even occurs "suddenly" after an induction phase. For this reason too, binder residues cannot penetrate into the joints of the mould. The rapid curing reaction also leads, particularly when an appropriate binder system is chosen, to the resulting green body being strong and dimensionally stable and not being subject to springback on opening the mould as a result of the compressibility of the reinforcing fibres.

Any loss in strength which nevertheless occurs because of the late application of pressure, i.e. in the case of the curing reaction having already progressed to a considerable extent, can be accepted because of the high total binder content made possible according to the invention.

Advantageous embodiments are described in the subordinate claims.

DETAILED DESCRIPTION OF THE PREFERRED EMBODIMENTS

A particularly preferred embodiment comprises coating the fibres, fibre bundles and random fibre agglomerates with a carbonizable polymer coating before they are further processed to give a pressing composition. This coating can be identical to the binder or different therefrom. Any materials combinations of coating and binder are conceivable. The polymer of the coating can be, for example, a hot-curing polymer, while the binder is a cold-curing polymer. The polymer of the coating can be a polyaddition product or a polycondensation product. The coating is advantageously softer than the binder. When using conditioned or otherwise pretreated fibres, the coating is superposed on the conditioning layer. The polymer of the coating and the binder preferably have a similar carbonization behaviour or carbonization profile, so that the two components are to at least some extent converted uniformly into pyrogenic carbon during the pyrolysis.

In a second step, the actual pressing composition is then produced. In the curing reaction, binder bridges are formed between the individual coated fibres and ensure the necessary cohesion of the pressed body. The advantage of this process variant is that correspondingly less binder has to be added to the polymer-coated fibres to produce a pressing composition, which further reduces the danger of resin escaping from the joints of the mould. In addition, no conditioning is necessary, since the carbon fibres which have been coated in this way are not subjected to any conversion during melt infiltration.

The polymer of the coating and the binder can also be selected so that only the polymer of the coating gives the carbon matrix of the C/C body during carbonization and the binder serves only for the setting of the pressing composition. In this case, sufficient binder should be present at the surface of the coated fibres to enable the pressing composition to be pressed and a satisfactory strength to be achieved.

The thickness and the hardness or brittleness of a cured polymer coating of the fibre particles are advantageously matched to one another in an optimal fashion with the aim of, on the one hand, attaching as much cured polymer composition as possible to the fibre particles but, on the other hand, keeping these sufficiently flexible for a bed of these particles still to be compacted under pressure so as to give a largely pore-free body. However, the preliminary coating should not be rubber-elastic, because otherwise there is a risk of the compressed particles springing back after curing of the binder added in the second step with rupture of the preliminary coating on opening of the mould. The required density and the desired shape stability and dimensional stability of the green body can then not be obtained.

The optimization of thickness and hardness of the preliminary coating or of the binder advantageously also includes the process parameters amount, viscosity in the uncured state and matching of the time profile of the curing reaction and the reaction rate of the curing reaction to the compaction rate during the pressing process.

This process for producing a green body having a high polymer content therefore consists of two stages or process steps:

In a first stage, the fibres, fibre bundles and fibre agglomerates, which may have been conditioned, are carefully, mixed with a reactive coating polymer, during which clumping together of the fibre particles is prevented by continual stirring of the fibre particles during the entire curing time. The amount of coating polymer added is preferably from 15 to 30% by weight, based on the amount of fibres. By means of appropriate process control, it is ensured that the fibre particles are completely impregnated and/or coated with a relatively strong polymer coating. The individual fibre particles formed in this way are, after curing, an essentially pourable composition having irregularly shaped "granules" of very different sizes. Appropriate selection of the final hardness of the coating polymer and an empirically optimized coating thickness can ensure a certain flexibility of the fibre particles and compressibility of a bed formed therefrom. The aim of this first stage is, on the one hand, to attach a very high proportion (up to the total amount) of the final total amount of carbonizable polymer present in the finished green body to the fibres or fibre agglomerates in a cured state, but, on the other hand, still to maintain a certain compressibility of the coated fibre particles so that the mixture of liquid binder and coated fibre particles to be formed in the second stage of the moulding of the green body requires only a relatively small proportion of polymer.

In a second stage, the coated fibre particles which have been formed in this way are mixed with the binder to form a moulding composition and metered into the mould where the moulding composition is cured in the above-described manner under pressure to give the green body. The amount added is preferably from about 10 to 20% by weight, based on the amount of fibres. Thanks to the preliminary coating of the fibre particles with curable coating polymer in the industrially less critical and reliably controllable first preparation stage, a smaller proportion of liquid binder can be employed in the second process stage of the production process. In this way, the risk of resin escaping from the joints of the mould on compression of the moulding composition which has been introduced is reduced, because the fibre particles are "wetted" with only a relatively thin layer of liquid polymer and this binder is firmly held on the fibre particles by means of surface forces.

The moulding composition prepared for the second production stage can be compressed and compacted by mechanical pressure thanks to the remaining deformability of the coated fibre particles, so that the pores which initially exist within the composition can be largely eliminated.

Binders based on cold-curing polyurethane are suggested for the cold-curing binder. The use of these binders is known in foundry work in the production of cold-curing casting cores in which the sand of the core is bound by means of polyurethane binders. For this purpose, two components, namely a polyether resin component and a polyisocyanate component are added to the sand. Curing is carried out either by passing a vaporizable catalyst liquid through the branched and overall gas-permeable pores of the core ("cold box process") or by mixing a basic catalyst into the polyether resin component ("cold box self-curing process").

Catalysts used are basic substances, for example amines such as methylamine, dimethylamine, trimethylamine, ethylamine, diethylamine, triethylamine, dimethylethylamine and mixtures thereof.

A further embodiment of the process of the invention provides for the binder used to be a two-component system comprising a polyether resin as resin component and a polyisocyanate as reaction partner, with the catalytically initiable curing reaction being started by introduction of gaseous catalyst into the still loose moulding composition after the mould has been closed. The catalyst gas becomes distributed throughout the entire moulding composition via the initially still narrow pore network which permeates the entire moulding composition. In this gas-treatment stage, no pressure or only a very slight pressure is applied to the moulding composition. The fine catalyst introduction points, which are integrated into the mould, are distributed over the entire inner surface of the mould. The introduction orifices are empirically optimized in respect of size, shape (slit, hole), distribution density and localization as a function of the workpiece. Preference is given to lateral inlet orifices in the mould which run perpendicular to the direction of the pressing pressure. The curing reaction can be delayed in a targeted way by appropriate choice of type and amount of the catalyst, modification of the individual components and addition of one or more suitable solvents. After the delayed commencement of the curing reaction, which proceeds at a reaction rate which can be predetermined, pressure is applied at a specific time to the moulding composition via the halves of the mould which can be moved relative to one another in the closing direction. This encloses the catalyst gas in the pores. The pressing pressure can also be increased as a function of the increase in strength of the curing resin at appropriate times. The pressure and the resulting compression of the moulding composition decreases the size of the pores, reduces the pore content and increases the density. The pressure can be increased continuously or stepwise.

The catalyst can also be enclosed in liquid form in microcapsules. The microcapsules can be poured and can be added as powder to the pressing composition or the binder. The catalyst is, for example, set free from the microcapsules by means of the pressure applied to the moulding composition. However, it can also be set free by dissolution of the microcapsules under the action of the components.

A further preferred embodiment of the process of the invention comprises using a self-curing two-component system based on polyurethane as binder. Here, the polyether resin component is admixed with a catalyst whose reactivity and/or concentration based on the amount of resin leads to a time delay in commencement of the curing reaction. The reaction rate of the curing reaction can also be adjusted, for example, by appropriate formulation of the resin components. The adjustment of the reaction rate is carried out independently of the adjustment of the commencement of the curing reaction.

Furthermore, the use of cold-cure processes using raw materials other than polyurethanes is also proposed. For example, cold-curing binders in the form of acid-curing or $SO_2$-curing systems based on, for example, furan resins or phenolic resins are suitable. These binders are by nature brittle, so that springback on opening the mould is avoided and the resulting green body has a high dimensional accuracy. A further advantage is that the systems can be made slower, so that curing occurs after a greater delay than in the case of polyurethane systems. This leaves more time for filling the mould. A longer pressing time is then sometimes necessary.

Mixtures of the polyurethane systems just described with cold-curing phenolic resins are also conceivable as cold-curing binders. The ratio of polyurethane system to phenolic resin is advantageously from 5:1 to 1:1.

A further advantageous embodiment comprises using a hot-curing process which takes place at relatively low temperatures (up to 100° C.) and relatively short times, particularly when the fibres have previously been coated. An example of a suitable system is the phenolic resin system comprising phenols, formaldehyde and hexamethylenetetramine (Croning process or Shell moulding process) known from core production as is customary in foundry work. If desired, a catalyst can be added. The ratio of phenols to formaldehyde is initially less than 1. Heating liberates formaldehyde under the action of the added hexamethylenediamine, so that the ratio of phenols to formaldehyde is reversed and becomes greater than 1. The soluble resol stage changes into the soft resitol stage, when the pressing composition can be compressed, advantageously to a density of 1.3, and then into the solid resit stage.

A particularly advantageous embodiment of the process of the invention provides for, in particular, untreated, e.g. uncoated, reinforcing fibres to be mixed with a binder and, if desired, additives or fillers and pressed to form a green body. Suitable fillers are, for example, carbon dust, carbon black or graphite, which have a positive effect on the future properties of the moulding by serving, for example, as a source of carbon. The fillers can, if desired, be provided with wetting agents.

When using self-curing systems, pressing is only commenced when the curing reaction has already commenced and the system has a highly viscous to rubber-like consistency. This can, if desired, be monitored using reference systems. This further reduces the risk of binder being able to escape from the joints of the mould.

The pressing composition can be pressed cold or hot, e.g. in a heated press.

An illustrative embodiment of the present invention is described in detail below.

Test specimens having a diameter of 5 cm were produced.

For this purpose, unconditioned short fibre bundles of carbon fibres from SGL or Toray were mixed with from 30 to 35% by weight of a phenolic resin system comprising phenols, formaldehyde, hexamethylenetetramine and an acid catalyst known from core production (Croning process) by stirring in a container. During the mixing process, hot air was blown into the container. After the phenolic resin had cured to the resitol stage and had a dry, flexible, rubber-like consistency, the coated fibres were carefully mixed with a cold-curing binder system comprising a benzyl ether resin and a polyisocyanate to give a pressing composition. A base (e.g. pyridine or dimethylethylamine) had been mixed into the benzyl ether resin component as basic catalyst. Part of the two-component system was retained as reference sample. The concentration of the components and the solvents was set so that the curing reaction was sufficiently delayed for the pressing mould to be able to be filled.

The still warm pressing composition was placed in a heated pressing mould. As soon as the reference sample had a highly viscous consistency, pressing was commenced. The pressing pressure was about 150 N/cm². After 8 minutes, the test specimen was taken from the mould. It was found to be a solid dimensionally stable body having sharp, uniform contours. The density was calculated as from 1.34 to 1.44 g/cm³.

In a second experiment, the same short fibre bundles were carefully mixed with 25% by weight of the same reactive two-component system and stirred for about 45 minutes until the polyurethane binder had cured (dead mixture). The concentrations of the components and the solvents were set so that the resulting binder was relatively soft and had little brittleness. This gave a granulated material having particle diameters of from about 2 to 6 mm. The granulated material was mixed with 12% by weight, based on the amount of fibres, of the same reactive two-component system to give a pressing composition. This time, the concentrations of the components and the solvents were set so that the resulting polyurethane binder was relatively hard and brittle. The pressing composition was pressed as described above. The resulting test specimen was likewise solid and dimensionally stable with sharp contours. The density was calculated as from 1.34 to 1.44 g/cm³.

In a third experiment, the same short fibre bundles without coating were mixed with 35% by weight of the same low-viscosity reactive two-component system and pressed as described as soon as the reference sample had a highly viscous consistency. The resulting test specimen was likewise solid and dimensionally stable with sharp contours and had a density of from 1.3 to 1.4 g/cm³.

Springback did not occur on releasing the pressing pressure.

What is claimed is:

1. Process for producing close-to-final-shape moldings from pressing compositions, comprising:
    forming a pressing compound by mixing
        fiber material selected from the group consisting of reinforcing fibers, fiber bundles, fiber fabrics, fiber mats, and random fiber agglomerates being composed of at least one of metal, glass, carbon, nitrogen, silicon, and boron,
        a binder comprising one or more cold-curing carbonizable polymers,
        a catalyst for initiating a curing reaction, and optionally, one or more additives or fillers;

introducing the pressing composition into a pressing mold;

pressing the pressing composition in the pressing mould under the action of pressure to give a molding, with pressure only being applied after the curing reaction has commenced; and removing of the molding from the pressing mold.

2. The process according to claim 1, wherein the forming comprises first and second process stages, wherein in the first process stage, the fiber material is coated with a curable, carbonizable, coating polymer, and in the second process stage, the coated fiber material is mixed with the binder.

3. The process according to claim 2, wherein in the first process stage, an amount of from about 15 to 30% by weight, based on the fiber material content, of the coating polymer is mixed with the fiber material and the catalyst, and stirred until the carbonizable coating polymer has cured.

4. The process according to claim 2, wherein in the second process stage, an amount of from about 10 to 20% by weight, based on the coated fiber material, of the binder is mixed with the coated fiber material.

5. The process according to claim 2, wherein the coating polymer is a polyaddition product or polycondensation product.

6. The process according to claim 2, wherein the coating polymer is made sufficiently soft so that the pressing composition produced therefrom is compressible.

7. The process according to claim 2, wherein the binder is made harder and more brittle than the coating polymer.

8. The process according to claim 1, wherein the fiber material is mixed in a single-stage process with the binder to form the pressing composition.

9. The process according to claim 8, wherein the binder is from about 20 to 50% by weight of the amount of fiber material.

10. The process according to claim 1, wherein the binder has a low viscosity before curing, and the pressing occurs after the binder has reached a highly viscous consistency during the curing reaction.

11. The process according to claim 1, wherein in that the amount the binder and catalyst are such that the curing reaction commences with a time delay after the mixing and the introducing.

12. The process according to claim 1, wherein the pressure is increased stepwise or continuously in proportion to an increase in solidity of the binder.

13. The process according to claim 1, wherein the fiber material has a length of at least 10 mm.

14. The process according to claim 1, wherein the binder is based on phenolic resin systems or polyurethane.

15. The process according to claim 1, wherein the binder is a polyurethane comprising a polyether resin component and a polyisocyanate component.

16. The process according to claim 15, wherein the catalyst comprises one or more amines.

17. The process according to claim 16, wherein the catalyst is selected from the group consisting of methylamine, dimethylamine, trimethylamine, ethylamine, diethylamine, triethylamine, and dimenthylethylamine.

18. The process according to claim 15, wherein the catalyst is a gas.

19. The process according to claim 18, further comprising feeding the gaseous catalyst into the pressing mold holding the pressing composition after the introducing.

20. The process according to claim 18, wherein the gaseous catalyst is introduced laterally into the pressing mold.

21. The process according to claim 15, wherein the catalyst is added to the pressing composition as a liquid enclosed in microcapsules, and the microcapsules are destroyed under the action of the binder after the introducing.

22. The process according to claim 1, wherein the binder is based on acid-curing or $SO_2$-curing systems.

23. The process according to claim 22, wherein the binder is based on furan resins or phenolic resins.

24. The process according to claim 22, wherein the binder is based on phenolic resins comprising phenols, formaldehyde and hexamethylenetetramine.

25. The process according to claim 1, wherein the fillers comprise carbon dust, carbon black, and graphite.

26. Process for producing close-to-final-shape moldings from pressing compositions, comprising:

forming a pressing compound by mixing fiber material selected from the group consisting of reinforcing fibers, fiber bundles, fiber fabrics, fiber mats, and random fiber agglomerates being composed of at least one of metal, glass, carbon, nitrogen, silicon, and boron, a binder comprising polyurethane having a polyether resin component and a polyisocyanate component, a catalyst for initiating a curing reaction, the catalyst being a liquid enclosed in microcapsules, and optionally, one or more additives or fillers;

introducing the pressing composition into a pressing mold;

pressing the pressing composition in the pressing mold under the action of a first pressure to break the microcapsules and a second pressure to give a molding, with the second pressure only being applied after the curing reaction has commenced; and removing of the molding from the pressing mold.

* * * * *